United States Patent Office 3,829,362
Patented Aug. 13, 1974

---

3,829,362
PROCESS FOR ENZYMATICALLY ISOMERIZING GLUCOSE TO FRUCTOSE
Robert Otto Horwath, Westport, and Gary William Cole, Southport, Conn., assignors to Standard Brands Incorporated, New York, N.Y.
No Drawing. Continuation-in-part of abandoned application Ser. No. 187,506, Oct. 7, 1971. This application July 27, 1973, Ser. No. 383,209
Int. Cl. C12b 1/00
U.S. Cl. 195—31 F          9 Claims

ABSTRACT OF THE DISCLOSURE

Glucose in a glucose-containing solution is enzymatically isomerized to fructose by the use of glucose isomerase derived from microorganisms of the genera *Nocardia, Micromonospora, Microbispora* and *Microellobospora*.

THE INVENTION

This application is a continuation-in-part of patent application Ser. No. 187,506 filed Oct. 7, 1971, now abandoned.

This invention relates to a process for enzymatically converting glucose in a glucose-containing solution to fructose.

There are many processes known in the art for converting glucose to fructose. These methods may be grouped into two broad categories.

In the first category, glucose is converted to fructose by the use of alkaline catalysts. There are many papers and patents which disclose various alkaline catalysts and the use thereof for converting glucose to fructose. Exemplary of processes using alkaline catalysts are those disclosed, for instance, in U.S. Pat. 2,487,121 to Fetzer et al.; U.S. Pat. 2,354,664 to Cantor et al.; U.S. Pat. 2,746,889 to Langlois et al.; U.S. Pats. 3,285,776, 3,305,395, and 3,383,245 to Scallet et al. However, there are a number of distinct disadvantages associated with alkaline isomerization. For instance, due to the non-selectivity of the alkaline catalysts various objectionable by-products are formed, such as large amounts of colored bodies and acidic materials. Refining alkaline-isomerized liquors to remove the objectionable by-products to produce an acceptable product requires rather complicated and costly procedures.

The second category for producing fructose-containing solutions involves the enzymatic conversion of glucose in a glucose-containing solution, e.g., corn syrup, to fructose. Various microorganisms are known in the art which produce glucose isomerase. For example, in an article appearing in Science, Vol. 125, pp. 648–9 (1957), it is disclosed that an enzyme derived from *Pseudomonas hydrophila* will isomerize glucose to fructose. Also, British Pat. 1,103,394 and Japanese Pat. 7428 (1966) to Takasaki et al. disclose that microorganisms classified as belonging to the *Streptomyces* genus, such as *Streptomyces flavovirens, Streptomyces achromogenes, Streptomyces echinatus*, and *Streptomyces albus*, produce glucose isomerase. There are many other microorganisms which are disclosed in the art as producing glucose isomerase. Other microorganisms disclosed include *Aerobacter cloacae, Bacillus megatherium, Acetobacter suboxydans, Acetobacter melanogenus, Acetobacter roseus, Acetobacter oxydans, Bacillus fructose* and *Lactobacillus fermenti*.

To enzymatically isomerize glucose to fructose, glucose isomerase is incorporated into a glucose-containing solution, e.g., corn syrup, and conditions are maintained so as to convert a portion of the glucose to fructose. The maximum amount of glucose which may be converted to fructose is establishd by the equilibrium constant between fructose and glucose which is about 1 at 60° C.

The conditions under which the microorganisms are propagated and the nutrients, growth factors, carbon sources, etc., used to obtain maximum yields of glucose isomerase may vary significantly depending upon the specific microorganism being propagated.

We have discovered that microorganisms of the genera *Nocardia, Micromonospora, Microbispora* and *Microellobospora* produce glucose isomerase. These microorganisms are characterized as having the ability to assimilate xylose and produce glucose isomerase. While the microorganisms are characterized as having the ability to assimilate xylose and produce glucose isomerase, it should be distinctly understood that it is contemplated that these microorganisms may assimilate other carbon or carbohydrate sources and produce glucose isomerase.

Exemplary of the preferred microorganisms used in the process of the present invention are *Nocardia asteroides* ATCC 21943 (IMRU #3148), *Nocardia dassonvillei* ATCC 21944 (IMRU #509), *Micromonospora coerula* ATCC 21945 (IMRU #12328), *Microbispora rosea* ATCC 21946 (IMRU #37485) and *Microellobospora flavea* ATCC 21947 (IMRU #3857R). ATCC is the abbreviation of the American Type Culture Collection located in Rockville, Maryland and IMRU is the abbreviation of the Institute of Microbiology, Rutgers University, located in New Brunswick, N.J.

A typical medium for propagation of these microorganisms may contain xylose, dextrose, sorbitol, corn steep liquor and a source of metal ions such as cobaltous ions and the like. The metal ions apparently activate or stabilize the glucose isomerase.

The glucose isomerase derived from the microorganisms may be contacted with or incorporated into a glucose-containing solution and conditions maintained to isomerize a portion of the glucose to fructose. The glucose isomerase used may be in the form of whole broth, i.e., the propagation medium, cellular material containing the glucose isomerase or a purified extract of the broth or the cells.

The conditions under which the enzymatic isomerization reaction is performed may vary widely, although it is contemplated that the typical pH and temperature ranges at which the reaction will be performed are from about 6 to about 8.5 and from about 45° to about 80° C., respectively. The preferred pH and temperature ranges under which the isomerization reaction may be performed are from about 6.5 to about 7.5 and from about 50° to about 65° C., respectively.

In order to more clearly describe the nature of the present invention, a specific example will hereinafter be described. It should be understood, however, that this is done solely by way of example and is intended neither to delineate the scope of the invention nor limit the ambit of the appended claims. In the example and throughout the specification, percentages refer to percent by weight and are based on the dry substance weight of the glucose-containing solution unless otherwise specified.

Example I

This Example illustrate the propagation of microorganisms of the genera *Nocardia, Micromonospora, Microbispora* and *Microellobospora* and the use of glucose isomerase derived therefrom to convert glucose to fructose.

The following microorganisms were propagated under aerobic conditions:

*Nocardia asteroides* ATCC 21943 (IMRU #3148)
*Nocardia dassonvillei* ATCC 21944 (IMRU #509)
*Micromonospora coerula* ATCC 21945 (IMRU #12328)

*Microbispora rosea* ATCC 21946 (IMRU #37485)
*Microellobospora flavea* ATCC 21947 (IMRU #3857R)

The propagation media contained, 5.0 g./l. xylose, 0.5 g./l. dextrose, 2.0 g./l. sorbitol, 40 g./l. corn steep liquor dry basis and 1.0 p.p.m. $CoCl_2$. The propagations were performed in Erlenmeyer flasks at a temperature of 30° C. on a rotary shaker to provide aerobic conditions. After the propagations were completed, cellular material was removed from the flasks by filtration, washed, suspended in deionized water and sonicated for about 40 seconds using a Branson Sonifier (Model S–125). The sonicated material was diluted to a known volume and centrifuged for about 5 minutes at 16,000 r.p.m.

The potencies of the supernatants were determined and found to be as follows:

| Microorganism | Potency (GIU/ml.)* |
|---|---|
| *Nocardia asteroides* ATCC 21943 (IMRU #3148) | 4.28 |
| *Nocardia dassonvillei* ATCC 21944 (IMRU #509) | 4.37 |
| *Micromonospora coerula* ATCC 21945 (IMRU #12328) | 3.46 |
| *Microbispora rosea* ATCC 21946 (IMRU #37485) | 1.71 |
| *Microellobospora flavea* ATCC 21947 (IMRU #3857R) | 1.73 |

* GIU is the abbreviation for Glucose Isomerase Unit and is that amount of enzyme which will convert 1 milligram of glucose to fructose per hour in a solution initially containing 4 percent of dextrose per liter, 20 mls. of a 1 molar solution of $MgSO_4$ per liter at a pH of 6.7 (maleic acid) and a temperature of 70° C.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

We claim:

1. A process for enzymatically converting glucose in a glucose-containing solution to fructose comprising providing in a glucose-containing solution glucose isomerase derived from microorganisms of the genera *Nocardia, Micromonospora, Microbispora* and *Microellobospora* and maintaining the glucose-containing solution under glucose-isomerizing conditions until a portion of the glucose is converted to fructose.

2. A process for enzymatically converting glucose in a glucose-containing solution to fructose as defined in claim 1, wherein the microorganisms are characterized as having the ability to assimilate xylose and produce glucose isomerase.

3. A process for enzymatically converting glucose in a glucose-containing solution to fructose as defined in claim 2, wherein the microorganism is *Nocardia asteroides* ATCC 21943 (IMRU #3148).

4. A process for enzymatically converting glucose in a glucose-containing solution to fructose as defined in claim 2, wherein the microorganism is *Nocardia dassonvillei* ATCC 21944 (IMRU #509).

5. A process for enzymatically converting glucose in a glucose-containing solution to fructose as defined in claim 2, wherein the microorganism is *Micromonospora coerula* ATCC 21945 (IMRU #12328).

6. A process for enzymatically converting glucose in a glucose-containing solution to fructose as defined in claim 2, wherein the microorganism is *Microbispora rosea* ATCC 21946 (IMRU #37485).

7. A process for enzymatically converting glucose in a glucose-containing solution to fructose as defined in claim 2, wherein the microorganism is *Microellobospora flavea* ATCC 21947 (IMRU #3857R).

8. A process for enzymatically converting glucose in a glucose-containing solution to fructose as defined in claim 1, wherein the microorganisms are cultivated in a medium comprising xylose, dextrose, sorbitol and corn steep liquor to produce glucose isomerase.

9. A process for enzymatically converting glucose in a glucose-containing solution to fructose as defined in claim 2, wherein the microoragnisms are cultivated in a medium comprising xylose, dextrose, sorbitol and corn steep liquor to produce glucose isomerase.

References Cited

UNITED STATES PATENTS 3,736,232   5/1973   Dworschack et al. _ 195—31 F

A. LOUIS MONACELL, Primary Examiner

T. G. WISEMAN, Assistant Examiner

U.S. Cl. X.R.

195—66 R